Dec. 20, 1966 C. C. GAMBILL 3,293,455

ELECTRICAL APPARATUS EMPLOYING FOUR-LAYER DIODE AND THERMISTOR

Filed April 29, 1963 2 Sheets-Sheet 1

INVENTOR.
Charles C. Gambill
BY
Carl A. Stickel
HIS ATTORNEY

Dec. 20, 1966 C. C. GAMBILL 3,293,455

ELECTRICAL APPARATUS EMPLOYING FOUR-LAYER DIODE AND THERMISTOR

Filed April 29, 1963 2 Sheets-Sheet 2

INVENTOR
Charles C. Gambill
BY
Carl A. Stickel
HIS ATTORNEY

United States Patent Office 3,293,455 Patented Dec. 20, 1966

3,293,455

ELECTRICAL APPARATUS EMPLOYING FOUR-LAYER DIODE AND THERMISTOR

Charles C. Gambill, Tipp City, Ohio, assignor to General Motors Corporation, Detroit, Mich., a corporation of Delaware Filed Apr. 29, 1963, Ser. No. 276,408
5 Claims. (Cl. 307—88.5)

This invention pertains to electrical apparatus and more particularly to means for controlling an electrical load with a minimum of radio interference.

It has been proposed to control semiconductor control devices in alternating current, phase control circuits by varying the phase angle at which the peak voltage is applied. I have found that such circuits cause objectionable radio interference and therefore may not be used in most localities.

It is an object of my invention to provide suitable, accurate, full wave, alternating current, electrical semiconductor multiple-layer diode control systems for an electrical load which are reliable, accurate, inexpensive and free of radio interference.

It is another object of my invention to provide a suitable, accurate, alternating current, electrical semiconductor control system for an electrical load which controls by either conducting or failing to conduct for one or more substantially complete consecutive alternate half cycles.

It is another object of my invention to provide a suitable, accurate, alternating current, electrical semiconductor control system for an electrical load which applies a peak voltage triggering signal to the semiconductor substantially at the time the voltage applied to it passes through zero at the beginning of each alternate half cycle.

It is another object of my invention to provide a suitable, accurate, alternating current, electrical semiconductor control system for an electrical load which applies a peak voltage triggering signal to the semiconductor substantially at the time the voltage applied to its passes through zero at the beginning of each half cycle and which controls the conduction throughout each alternate half cycle by controlling the amplification of the peak voltage.

These and other objects are attained in the forms shown in the drawings in which, in the first form, a Shockley type, four-layer diode is connected in series with the load across the alternating current supply source. A step-down and step-up transformer and rectifier system applies a peak voltage to the four-layer diode at the beginning of each positive or each negative half cycle of the alternating current. The current is amplified in the transformer circuit by a transistor under the control of a thermistor for controlling the load in accordance with temperature conditions. In the second form, the four-layer diode is connected in a rectifier bridge so that it conducts current throughout each half cycle when the control current at the voltage peak supplied to it is sufficiently amplified in the rectified full wave transformer circuit provided for it. In the third form, two Shockley type, four-layer diodes are connected in a parallel inverse bridge arrangement and supplied with voltage peaks through a step-down, step-up transformer system having rectified full wave current applied to it producing a voltage peak through amplification by a transistor under the control of a thermistor. In the fourth form, a five-layer diode, capable of conducting in either direction when a break-over voltage is applied to it, is connected in series with the load. A step-down, step-up transformer arrangement in which rectified current is amplified by a transistor under the control of a thermistor is provided for applying the peak voltage to the five-layer diode at the beginning of each half cycle.

Further objects and advantages of the present invention will be apparent from the following description, reference being had to the accompanying drawings wherein preferred embodiments of the present invention are clearly shown.

Figure 5:
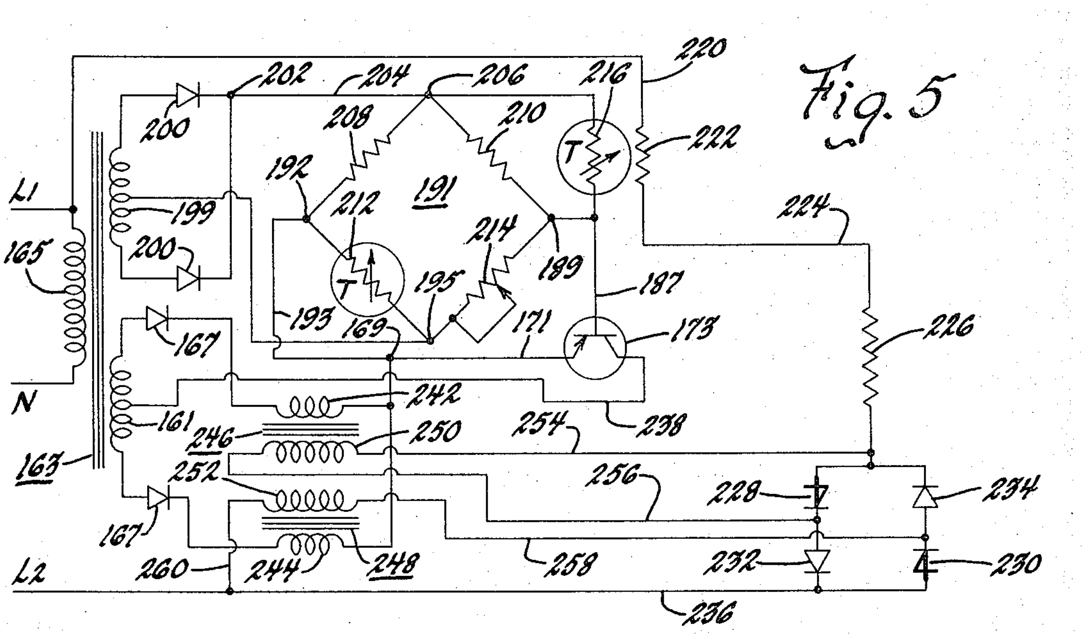
Figure 6:
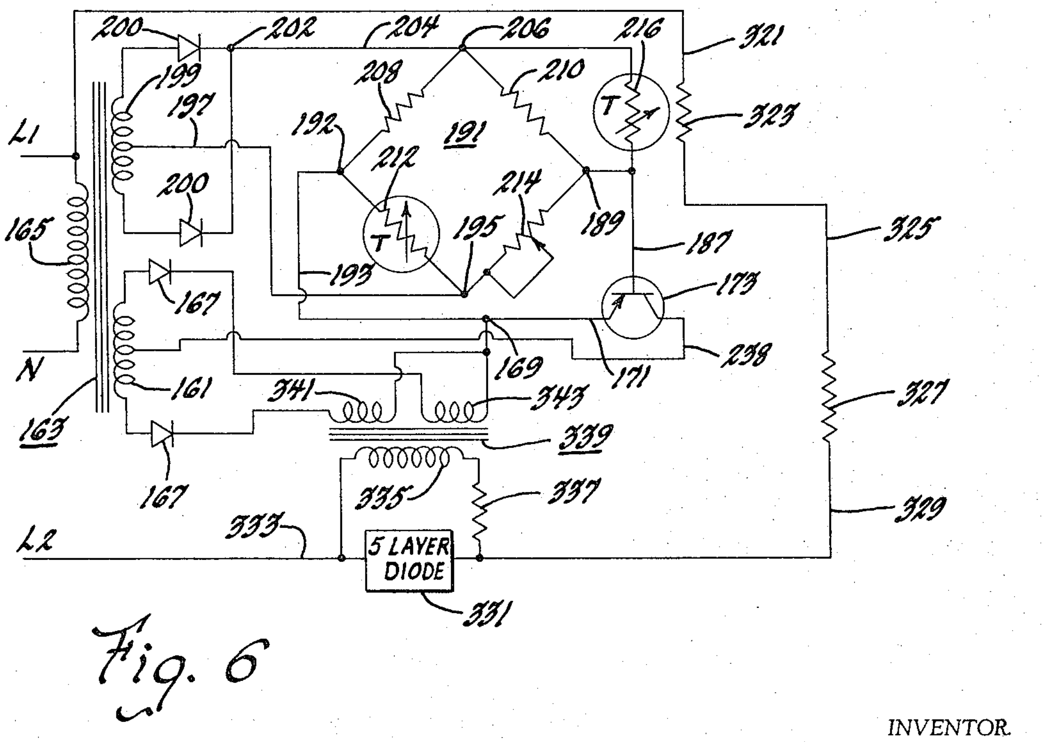

FIGURE 5 is a wiring diagram showing the use of two Shockley type, four-layer diodes arranged in a parallel inverse bridge to apply full wave alternating current to the electrical load; and FIGURE 6 is a wiring diagram showing the use of a five-layer diode for controlling the flow of current through the electrical load controlled by a step-down, step-up transformer arrangement under the control of a transistor amplifier.

Figure 1:
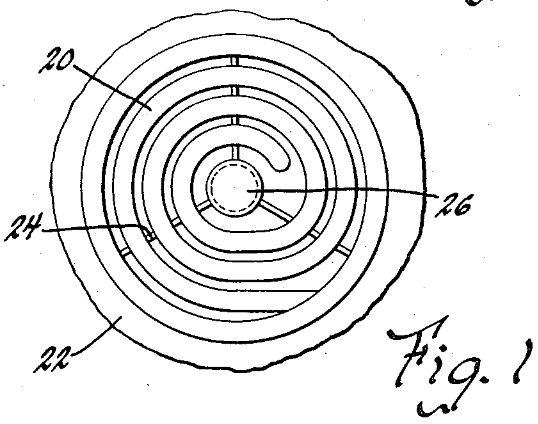
FIGURE 1 is a top view of a surface heater of an electric range embodying one form of my invention.

Referring now to the drawings and more particularly to FIGURE 1, there is shown an electric surface heater 20 of the sheathed tubular type which extends in a spiral fashion on the range top 22 and is supported by a three-arm spider 24 so that it can support a pan or other cooking utensil. Supported by the center of the spider 24 is a spring mounted thermistor device 26 adapted to be pushed by the spring into contact with the bottom of the pan or kitchen utensil.

Figure 2:
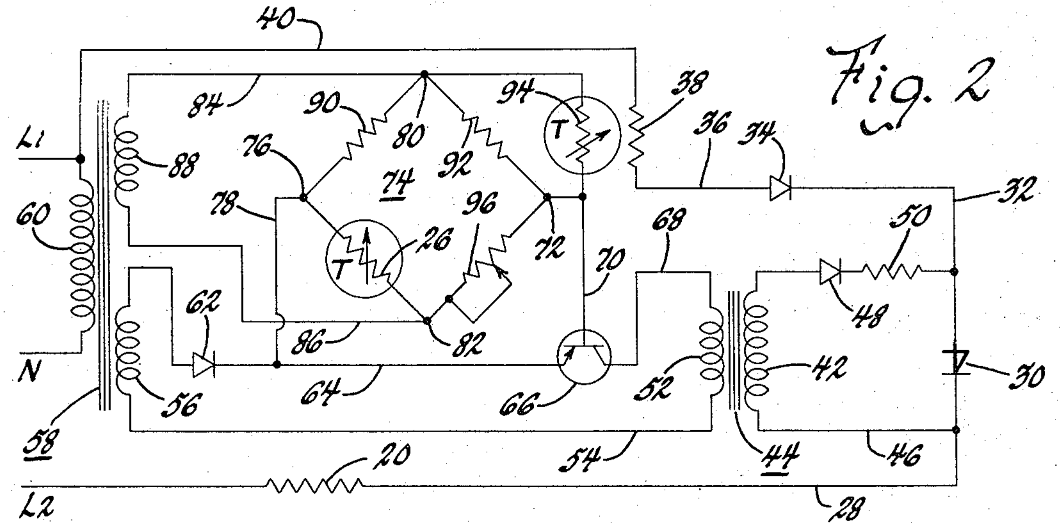
FIGURE 2 is a wiring diagram illustrating an arrangement for employing a Shockley type, four-layer diode for controlling the load.

Referring now more particularly to the wiring diagram, FIGURE 2, the heater 20 is shown as having one terminal connected to the alternating current supply conductor $L_2$ and its second terminal connected through the conductor 28 to a Shockley type, four-layer diode 30 which in turn is connected by a conductor 32 through a diode rectifier 34, a conductor 36, a $\frac{2}{100}$ of an ohm heater 38 and the conductor 40 to a second alternating current supply conductor $L_1$, preferably, the supply conductors $L_1$ and $L_2$ are supply conductors of a 117 or 235 volt voltage source providing conventional alternating current. The Shockley type four-layer diode is chosen so as to have a higher break-over voltage than the maximum voltage of the alternating current supply which is connected to the supply conductors $L_1$ and $L_2$. If such a diode is not available, the conductor $L_2$ may be connected instead to the neutral conductor N which will reduce the supply voltage to about 117 volts.

To control the conduction of the Shockley type, four-layer diode 30 so as to control the energization of the heater 20, I provide a control system in which, when it is desired to conduct, there is applied to the Shockley type, four-layer diode 30, substantially at the beginning of each positive half cycle or at the beginning of each negative half cycle, a voltage peak which is substantially greater than the line voltage and is sufficient to cause the four-layer diode 30 to conduct for as long as voltage peaks of sufficient amplitude and current continue to be provided by the control system. This is accomplished by the application of rectifier half wave current in the step-up, step-down transformer system which provides a wave form having an initial peak voltage followed by declining or reduced voltages. For this purpose, the secondary winding 42 of the step-up transformer 44 has one terminal connected by the conductor 46 to the cathode electrode of the diode 30 while the other terminal of the secondary winding 42 is connected through a rectifier 48 and a small resistance 50 to the anode electrode of the diode 30.

The step-up transformer 44 has one terminal of its primary winding 52 connected by the conductor 54 to one terminal of the secondary winding 56 of the step-down transformer 58. The primary winding 60 of the transformer 58 is connected between the alternating current supply conductor $L_1$ and the neutral supply conductor N to apply 117 volts thereto. The second terminal of the secondary winding 56 is connected through the diode rectifier 62 and the conductor 64 with the emitter electrode of a PNP transistor 66. The emitter electrode of the PNP transistor 66 is connected by the conductor 68 to the second terminal of the primary winding 52 of the transformer 44. This step-down, step-up transformer and rectifier arrangement through the selection of non-ideal transformers of the proper impedance angle supplied the peak voltage to the opposite sides of the diode 30 substantially at the beginning of each positive half wave voltage cycle or each negative half wave voltage cycle. When conduction is called for, the transistor 66 amplifies the rectified half wave current and voltage sufficiently to provide the voltage peaks sufficient to cause the Shockley type, four-layer diode to conduct for substantially complete consecutive half-cycles of alternating current for as long as conduction is needed.

To accomplish this, the base electrode of the transistor 66 is connected by the conductor 70 to the first output terminal 72 of a bridge control circuit having its second output terminal 76 connected by the conductor 78 to the conductor 64 connecting with the emitter electrode of the transistor 66. The input terminals 80 and 82 of the bridge circuit 74 are connected respectively by the conductors 84 and 86 to the opposite terminals of the secondary winding 88 of the transformer 58. Connected between the input terminal 80 and the output terminal 76 is a fixed resistance 90 while connected between the input terminal 80 and the output terminal 72 is a fixed resistance 92. Connected in parallel with the resistance 92 is an anticipating thermistor 94 associated in heat transfer relation with the low wattage heater 38.

Connected between the input terminal 82 and the output terminal 72 is a variable potentiometer 96 having 1000 ohms maximum resistance. The sensing thermistor 26 is connected between the input terminal 82 and the output terminal 76. This sensing thermistor 26 may have a resistance of 3500 ohms at 77° F. which reduces to 40 ohms at 500° F. The anticipating thermistor 94 may have a resistance of 10,000 ohms at 77° F. which reduces to 60 ohms at 350° F.

In operating, the potentiometer 96 is adjusted to the resistance corresponding to the resistance of the thermistor 26 at the temperature desired to be maintained upon the bottom of the pan or other cooking utensil resting on the surface heater 20. As long as the temperature of the pan or utensil is below the selected temperature, the resistance of the thermistor 26 will be higher than the resistance of the potentiometer 96 causing an unbalance in the Wheatstone bridge circuit 74 and causing a voltage to be applied through the conductor 70 to the base of the transistor 66. This will provide sufficient current flow so that the voltage peaks applied by the secondary winding 42 to the Shockley type, four-layer diode 30 will cause the break-over of current through the Shockley type, four-layer diode 30 so that energy may pass through the electrical load 20 as long as the thermistor 26 remains substantially below the temperature selected by the adjustment of the potentiometer 96. The heater 38 heats the anticipating thermistor 94 so that, through the connection of the conductor 70 with the base of the PNP transistor 66, the conduction of current through the diode 30 is stopped at a temperature just sufficiently below the selected temperature that the stored heat in the heater 20 will carry the temperature up to the selected temperature so as to reduce overshooting of the selected temperature. Thereafter, the amplification of the transistor 66 will be controlled so as to maintain the selected temperature for as long as is desired.

Figure 3:
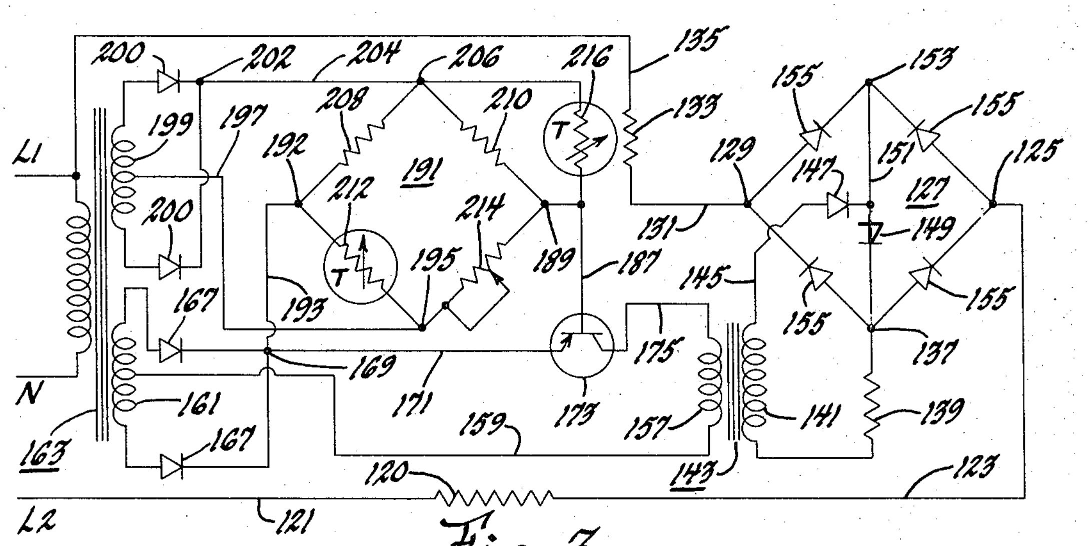
FIGURE 3 is a modified form of wiring diagram illustrating the use of a rectifier bridge for causing the Shockley type, four-layer diode to conduct current during both the positive and negative cycles.

In the form shown in FIGURE 3, there is arranged a circuit in which the full wave alternating current is applied to the electric heater 120 constituting the electrical load. One terminal of this heater 120 is connected by the conductor 121 to the supply conductor $L_2$ while the second terminal of the heater 120 is connected by the conductor 123 to the output terminal 125 of a rectifier bridge 127. The second output terminal 129 of the rectifier bridge 127 is connected through the conductor 131 and a 2/100 of an ohm heater 133 and a conductor 135 to the second supply conductor $L_1$. The rectifier bridge 127 has an input terminal 137 connected through a resistance 139 to one terminal of the secondary winding 141 of a transformer 143. The second terminal of the secondary winding 141 is connected through the conductor 145 and a diode rectifier 147 to the anode of a Shockley type, four-layer diode 149. The anode is also connected by the conductor 151 to a terminal 153 while the cathode of the Shockley type, four-layer diode 149 is connected to the terminal 137. Diodes 155 are oppositely connected to each of the terminals of the bridge 127 so as to apply full wave, rectified current to the Shockley type, four-layer diode 149 in such a way that full wave alternating current is applied to the heater 120 whenever the diode 149 conducts.

Figure 4:
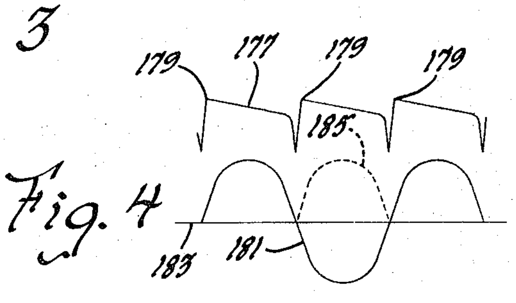
FIGURE 4 is a graph showing the control voltage plotted in coordination with the alternating current voltage applied to the controlling semiconductor.

The primary winding 157 of the transformer 143 has one of its terminals connected by the conductor 159 to the center tap upon the secondary winding 161 of a transformer 163. The primary winding of the transformer 163 is connected between the supply conductors $L_1$ and N. The two opposite end terminals of the secondary winding 161 are connected through the diode rectifiers 167 to a junction 169 to provide full wave rectification. The junction 169 is connected by the conductor 171 to the emitter electrode of a PNP transistor 173 which has its collector electrode connected by a conductor 175 to the second terminal of the primary winding 157 of the transformer 143. This step-down, step-up transformer circuit with rectifiers provides a voltage application to the Shockley type, four-layer diode 149 as shown by the voltage curve 177 in FIGURE 4. As shown, this voltage curve 177 provides a peak 179 substantially at the beginning of each half wave of the alternating current sine voltage curve 181 shown in FIGURE 4 at the zero voltage line 183. The rectifying bridge 127 applies rectified, positive half wave current as indicated above the zero line 183 by the full line 181 and the dotted line 185 to the four-layer diode. When there is insufficient amplification by the transistor 173, the voltage peaks 179 remain below the voltage necessary to apply to the Shockley type, four-layer diode 149.

To make the diode 149 conduct, the current is amplified by the transistor 173. For this purpose, the base of the transistor 173 is connected by the conductor 187 to the output terminal 189 of the bridge circuit 191. This bridge circuit has a second output terminal 192 connected by the conductor 193 to the junction 169 connecting with the emitter electrode of the transistor 173. The bridge circuit 191 has an input terminal 195 connected by the conductor 197 to the center tap of the secondary winding 199 of the transformer 163. The end terminals of the secondary winding 199 are connected through the diodes 200 to the junction 202 which connects through the conductor 204 to the input terminal 206 of the bridge circuit 191. The input terminal 206 is connected by the fixed resistors 208 and 210 to the output terminals 192 and 189 respectively. Connected between the input terminal 195 and the output terminal 192 is a sensing thermistor 212 having a resistance of 3500 ohms at 77° F. which reduces to 40 ohms at 500° F. This sensing thermistor 212 is preferably incorporated in a spring mounted contact device, such as illustrated at 26 in FIGURE 1.

Between the input terminal 195 and the output terminal 189 is an adjustable potentiometer 214 having a maximum resistance of 1000 ohms. Connected in parallel circuit with the resistance 210 is the anticipating thermistor 216 which is associated in heat transfer relationship with the anticipating heater 133. The anticipating thermistor 216 preferably has a resistance of 10,000 ohms at 77° F. which reduces to 60 ohms at 350° F.

The operation of the circuit shown in FIGURE 3 is substantially the same as that shown in FIGURE 2 except for the full wave rectification. As in the wiring diagram, FIGURE 2, any unbalance in the bridge circuit 191 will apply a voltage and current to the base and emitter terminals of the transistor 173 to cause it to amplify the voltage peaks applied to the four-layer diode sufficiently to cause the diode to conduct and to allow full wave alternating current to flow through the heater 120 until the sensing thermistor 212 is brought up approximately to the temperature selected by the potentiometer 214. The anticipating thermistor 216 prevents overshooting in substantially the same manner as described for FIGURE 2. The use of full wave rectification substantially doubles the heat output of the heater 120. The rectifier bridge causes the four-layer diode 149 to conduct unidirectionally each half cycle of the alternating current. The rectifier bridge 127, therefore, assures the application of full wave alternating current to the heater 120. When the selected temperature is reached, the current flow will stop at the end of the half cycle.

In the form shown in FIGURE 5, the transformer 163, the bridge circuit 191, the transistor 173 and the associated diode rectifiers are similar to that shown in FIGURE 3 and bear the same reference characters. The supply conductor $L_1$ is connected through the conductor 220 and the $\frac{2}{100}$ of an ohm heater 222 and the conductor 224 to one terminal of the heater 226 constituting the electrical load which may correspond to the heater 20 of FIGURE 1. The second terminal of the heater 226 is connected through the Shockley type, four-layer diodes 228 and 230 which together with the rectifier diodes 232 and 234 are arranged in parallel, inverse bridge arrangement which in turn connects through the conductor 236 to the supply conductor $L_2$ to provide the application of full wave alternating current to the heater 226 whenever the Shockley type, four-layer diodes 228 and 230 are conducting. A step-down, step-up transformer and rectifier arrangement controlled by the transistor 173 is provided for controlling the conduction of each of the Shockley type, four-layer diodes 228 and 230. The center tap of the secondary winding 161 is connected to the conductor 238. The collector electrode of the transistor 173 is also connected to the conductor 238. The opposite ends of the secondary winding 161 are connected through the diodes 167 to the primary windings 242 and 252 of the transformers 246 and 248. The second terminals of these windings are connected to the junction 169 on the conductor 171. The opposite ends of the secondary winding 250 are connected by the conductors 254 and 256 to the opposite sides of the four-layer diode 228. The opposite terminals of the secondary winding 252 are connected by the conductors 258, 260 and 236 to the opposide sides of the four-layer diode 230.

This system operates substantially in the same manner as the wiring diagram in FIGURE 3. When the bridge circuit 191 is sufficiently unbalanced, the transistor 173 will amplify the current through both the primary windings 242 and 244 sufficiently to raise the voltage in the secondary windings 250 and 252 high enough in the form of a peak at the beginning of each half wave to cause the Shockley type, four-layer diodes 228 and 230 to conduct in opposite directions of alternating current flow. The step-down, step-up transformer and rectifier arrangement applies this peak voltage to the Shockley type, four-layer diodes at the beginning of the half cycle in which the respective four-layer diodes 228 and 230 may conduct. In this way, full wave alternating current may be used for the heater 226, properly controlled through the Shockley type, four-layer diodes to maintain the desired temperature level without overshooting and without radio interference. Sufficient reduction in amplification by the transistor 173 stops the conduction of both diodes 228 and 230 temporarily.

In FIGURE 6, the transformer 163, the bridge circuit 191 and the transistor 173 are substantially the same as that shown in FIGURE 5 and bear the same reference characters. The supply conductor $L_1$ is connected by the conductor 321 to a $\frac{2}{100}$ ohm anticipating electric heater 323 associated with the anticipating thermistor 216. This heater 323 in turn is connected through the conductor 325 to one terminal of the electric heater 327 having its opposite terminal connected through the conductor 329 to one terminal of the five-layer diode 331. The opposite terminal of this five-layer diode 331 is connected through the conductor 333 to the supply conductor $L_2$.

The five-layer diode 331 has the characteristics of two oppositely arranged Shockley type, four-layer diodes so that, when provided with a suitable voltage peak, it will conduct for the remainder of the half cycle in either direction of current flow.

According to my invention, to prevent radio interference, the peak voltage is applied to this five-layer diode 331 at the beginning of each cycle of the alternating current. This is also done through the use of the step-down, step-up transformer and rectifier arrangement amplified by the PNP transistor 173. Specifically, the secondary transformer winding 335 and a resistance 337 are connected to the conductors 333 and 329 on opposite sides of the five-layer diode 331. The secondary winding 335 is a part of the step-up transformer 339 having two primary windings 341 and 343. One terminal of each of these windings is connected to the junction 168 which, through the conductor 171, connects with the emitter electrode of the transistor 173. The other terminal of the primary winding 341 is connected through the diode 167 with one terminal of the secondary winding 161 while the other terminal of the primary winding 353 is connected through a diode 167 with the opposite terminal of the secondary winding 161. This arrangement provides voltage peaks similar to the voltage peaks 179 shown in FIGURE 4 oriented with the beginning of each half wave of the alternating current curve 181 applied to the five-layer diode 331.

The synchronization is similar and, when amplified sufficiently by the transistor 173 in accordance with the unbalance of the bridge 191, causes conduction through five-layer diode 331 during each complete half cycle of alternating current substantially from the beginning to the end so that there is substantially no radio interference and the heater 327 operates at its maximum output whenever heating is called for by the sensing thermistor 212. All of these circuit arrangements provide a way in which the surface heater may be quickly brought up substantially to the temperature desired while overshooting is prevented by the anticipating thermistor. After reaching the selected temperature as set by the adjustment of the potentiometer, this temperature is maintained by causing the four or five-layer diodes to conduct for each half cycle or each alternate half cycle from the beginning to the end so that radio interference is substantially prevented.

While the embodiments of the present invention, as herein disclosed, constitute preferred forms, it is to be understood that other forms might be adopted.

What is claimed is as follows:

1. In combination, an electrical load, alternating current supply conductors connected to said electrical load, a multiple layer semiconductor diode connected in series with said electrical load, said diode having the characteristic that its resistance to current flow breaks down when a predetermined voltage is applied across it, means for applying across said diode every half cycle a voltage peak substantially at the time in the alternating current sine wave to said diode when the supply voltage passes through zero, and a three terminal semiconductor amplifier associated with said applying means for amplifying said voltage peak above said predetermined voltage to cause said diode to conduct current during substantially all of a plurality of consecutive substantially identical half cycles of alternating current.

2. In combination, an electrical load, alternating current supply conductors connected to said electrical load, a multiple layer semiconductor diode connected in series with said electrical load, said diode having the characteristic that its resistance to current flow breaks down when a predetermined voltage is applied across it, means for applying across said diode every half cycle a voltage peak substantially at the time in the alternating current sine wave to said diode when the supply voltage passes through zero, and a three terminal semiconductor amplifier associated with said applying means for amplifying said voltage peak above said predetermined voltage to cause said diode to conduct current during substantially all of a plurality of consecutive substantially identical half cycles of alternating current, and temperature responsive means connected to one of the terminals of said amplifier for controlling said amplifier.

3. In combination, an electrical load, alternating current supply conductors connected to said electrical load, a multiple layer semiconducting diode connected in series with said electrical load, said diode having the characteristic that its resistance to current flow breaks down when a predetermined voltage is applied across it, means for applying across said diode every half cycle a voltage peak higher than the voltage supplied by said supply conductors substantially at the time in the application of the alternating current sine wave to said diode when the supply voltage passes through zero comprising a first transformer electrically connected to one of said supply conductors and having output connections, a second transformer having input connections electrically connected to said output connections and having output connections connected across said diode for applying to said multiple layer diode a voltage peak, a three terminal semiconductor amplifier electrically connected between an output connection of said first transformer and an input connection of said second transformer for amplifying said voltage peak, and a second diode connected in series with one of said connections of one of said transformers.

4. In combination, an electrical load, alternating current supply conductors connected to said electrical load, a multiple layer semiconductor diode connected in series with said electrical load, said diode having the characteristic that its resistance to current flow breaks down when a predetermined voltage is applied across it, means for applying across said diode every half cycle a voltage peak higher than the voltage supplied by said supply conductors substantially at the time in the application of the alternating current sine wave to said diode when the supply voltage passes through zero comprising a first transformer electrically connected to one of said supply conductors and having output connections, a second transformer having input connections electrically connected to said output connections and having output connections connected across said multiple layer diode for applying to said multiple layer diode a voltage peak, a three terminal semiconductor amplifier electrically connected between an output connection of said first transformer and an input connection of said second transformer for amplifying said voltage peak, a second diode connected in series with one of said connections of one of said transformers, and temperature responsive means connected to one of the terminals of said amplifier for controlling said amplifier.

5. In combination, an electrical load, alternating current supply conductors connected to said electrical load, a five-layer semiconductor diode connected in series with said electrical load, said diode having the characteristic that its resistance to current flow breaks down when a predetermined voltage is applied across it, means for applying across said diode a voltage peak substantially at the time in the alternating current sine wave to said diode when the voltage of the supply conductors passes through zero, and a three terminal semiconductor amplifier associated with said applying means for amplifying said voltage peak above said predetermined voltage to cause said diode to conduct current during substantially all of a plurality of consecutive substantially identical half cycles of alternating current.

References Cited by the Examiner

UNITED STATES PATENTS

| | | | |
|---|---|---|---|
| 2,962,607 | 11/1960 | Bright | 307—88.5 |
| 3,050,611 | 8/1962 | Kamide | 307—88.5 |
| 3,051,813 | 8/1962 | Busch et al. | 307—88.5 |

ARTHUR GAUSS, *Primary Examiner.*

J. BUSCH, *Assistant Examiner.*